Dec. 8, 1964  W. P. POLANIN  3,160,234
TREAD BRAKE ARRANGEMENT
Filed June 21, 1962  3 Sheets-Sheet 1

INVENTOR.
Walter R. Polanin
BY
Walter J. Schlegel Jr.
Atty.

Witness:
Robert O. Veeti

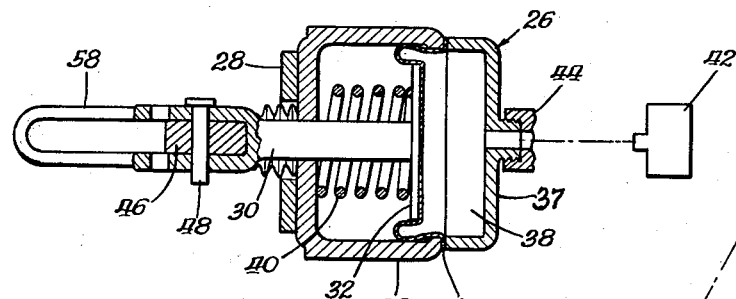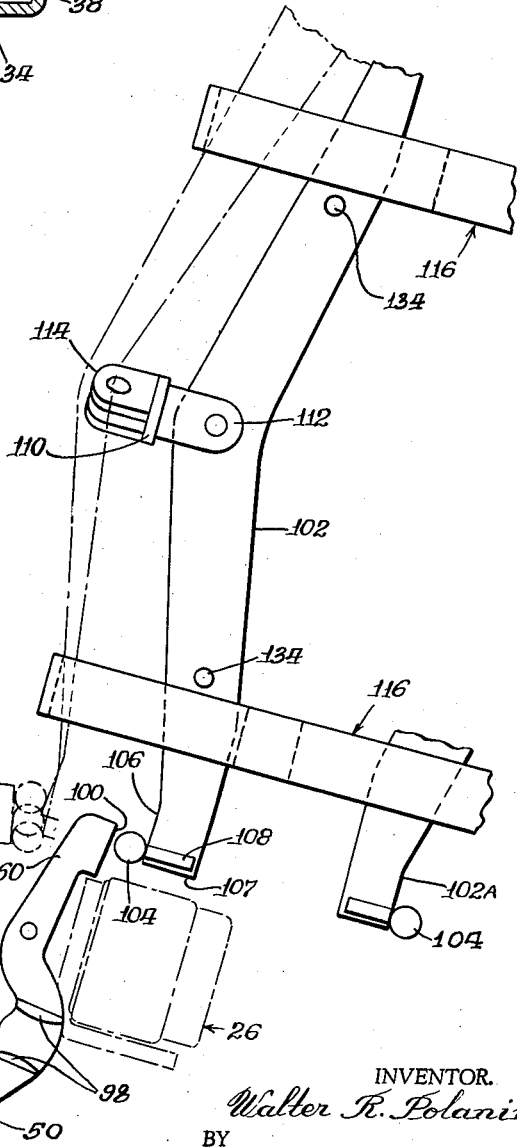

Dec. 8, 1964 W. P. POLANIN 3,160,234
TREAD BRAKE ARRANGEMENT
Filed June 21, 1962 3 Sheets-Sheet 3

Witness:
Robert O. Velte

INVENTOR.
Walter P. Polanin
BY
Walter F. Schlegel Jr.
Atty.

3,160,234
Patented Dec. 8, 1964

3,160,234
TREAD BRAKE ARRANGEMENT
Walter P. Polanin, Hammond, Ind., assignor to Amsted Industries Incorporated, Chicago, Ill., a corporation of New Jersey
Filed June 21, 1962, Ser. No. 204,127
5 Claims. (Cl. 188—33)

This invention relates to brake arrangements for railway car trucks and more particularly to a wheel tread brake arrangement adapted for use on a conventional four wheel freight car truck having spaced truss type side frames interconnected by a bolster and supported at their ends upon wheel and axle assemblies.

Briefly, the present invention contemplates the provision of four self-contained tread brake units supported on the side frames adjacent their respective wheels, each brake unit comprising a brake head-shoe assembly adapted to be selectively actuated by either power or manual means to frictionally engage the tread surface of a wheel.

An object of the invention resides in the provision of a self-contained tread brake unit which is relatively inexpensive in construction and reliable in operation.

Another object of the invention resides in the provision of a tread brake unit adapted to be detachably mounted on a side frame of a railway car truck.

A further object of the invention resides in the provision of a self-contained tread brake unit embodying a slack adjusting means.

The invention embodies other novel features, details of construction and arrangement of parts which are hereinafter set forth in the specification and claims and illustrated in the accompanying drawings, forming part thereof, wherein:

FIGURE 3 is a section taken on line 3—3 of FIGURE 2;

FIGURE 5 is a top view of the hand brake arrangement shown in FIGURE 4;

It will be understood that certain elements have been intentionally omitted from some of the views where these elements are shown to better advantage in other views.

Figures 1, 2:
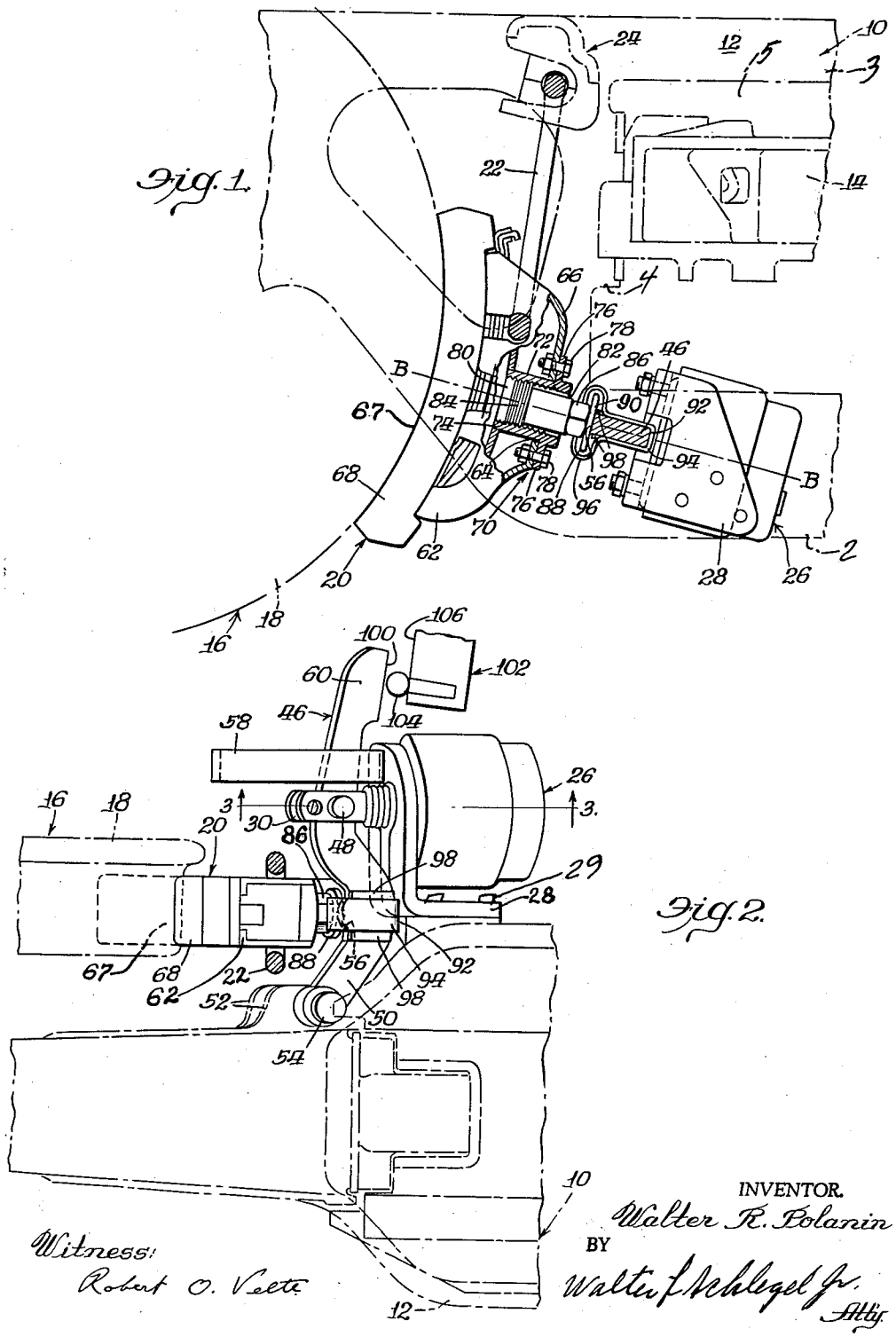
FIGURE 1 is a fragmentary side elevation, partly in vertical section, showing a railway vehicle provided with a self-contained tread brake arrangement embodying features of the invention.
FIGURE 2 is a top plan view of the structure illustrated in FIGURE 1.
Figure 4:
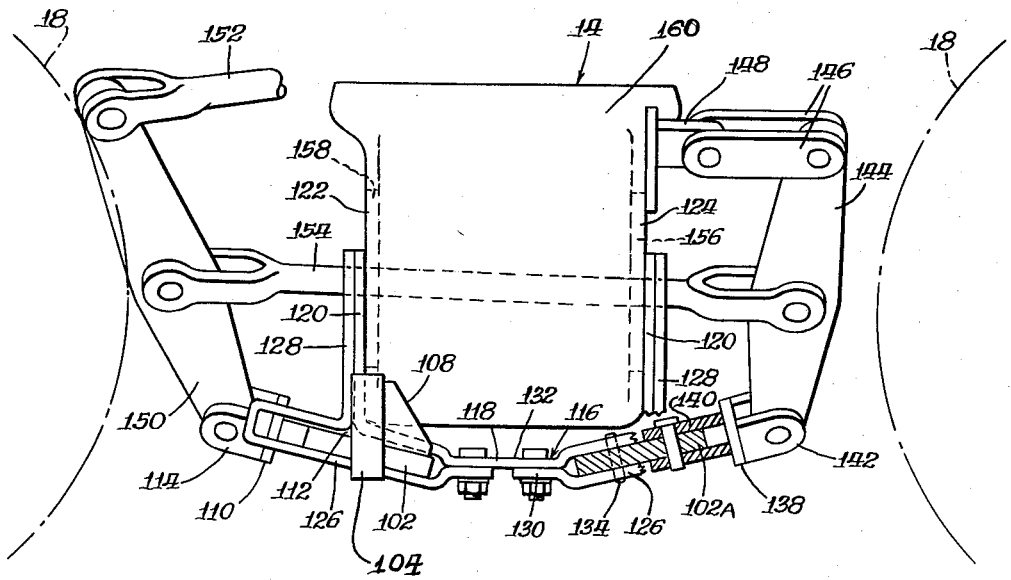
FIGURE 4 is a fragmentary side elevation, partly in vertical section, illustrating a hand brake arrangement embodying features of my invention.

Referring now to the drawings for a better understanding of the invention and more particularly to FIGURES 1 to 3 therein, a self-contained tread brake unit embodying features of the invention is shown as mounted for use on a conventional railway freight car truck comprising spaced truss type side frames 12 supported at their ends on wheel and axle assemblies 16 and interconnected by a bolster 14. Each side frame 12 comprises tension and compression members 2 and 3 interconnected by spaced columns 4 to define a window 5 to receive one end of the bolster. Conventional spring groups are seated on the tension members 2 to resiliently support the bolster adjacent its ends.

Each of the four wheels 18 is provided with a tread brake unit which is shown as comprising a brake head-shoe assembly 20 pivotally connected to the lower end of a brake hanger 22 having its upper end pivotally connected to a bearing bracket 24 secured to the side frame compression member 3. A power device 26 is secured to a bracket 28 adapted to be detachably mounted on the side frame tension member 2 between the columns 4 by means of cap screws 29. The power device is shown as comprising a piston rod 30 secured to a plate 32 which is engaged by a flexible diaphragm 34 having its periphery secured to the wall of a cylinder 36. A compression spring 40 is provided in the cylinder to yieldably resist movement of the piston rod from its retracted position. The cylinder is connected to a source 42 of pressurized fluid by means of a conduit 44 provided with a conventional control valve.

The piston rod 30 is provided with a bifurcated outer end which is pivotally connected to an actuating lever 46 by a pin 48. The outboard end 50 of the lever 46 is pivotally connected by means of a pin 54 to lugs 52 provided on the side frame tension member 2 adjacent the lower end of a column 4. The lever 46 is formed with an arcuate convex abutment surface 56 disposed between the pivot pins 48 and 54 for abutting engagement against a surface on the assembly 20, as hereinafter described. The inboard end 60 of the lever 46 is slidably supported on a guide bracket 58 secured to the bracket 28.

Brake head-shoe assembly 20 comprises a brake shoe 68 mounted on a brake head 62 having a centrally disposed opening 64 extending through its back wall 66. A slack adjuster assembly 70 comprises a tubular adjuster housing 72 partially received in opening 64, said housing 72 having a portion 74 extending into the brake head 62 from the back wall 66. The adjuster housing 72 is provided with a pair of mounting lugs 76 rigidly secured to the back wall 66 by bolt and nut assemblies 78. The housing 72 is internally threaded at 80 to substantially its full length.

An adjuster screw 82 has a threaded end portion 84 engaging the threads 80 in the housing 72. The other end of the adjuster screw 82 is provided with a hexagonal portion 86 and an abutment flange 88 having an abutment surface 90 on the end thereof engaged against the actuating surface 56 on the lever 46.

A retainer clip 92, preferably made of spring steel is provided with a substantially U-shaped central portion 94 having legs straddling the lever 46 adjacent the actuating surface 56. The end portions 96 of the clip 92 extend over opposite sides of the flange 88 with the ends thereof engaging flat surfaces of portion 86.

The lever 46 is provided with two sets of stop lugs 98 located on opposite sides of the lever 46, so as to have one lug adjacent each side of the U-shaped portion 94 of clip 92 to prevent the clip 92 from being moved inboardly or outboardly along lever 46 except when the clip 92 is intentionally sprung out over the stop lugs 98.

The slack adjuster 70 may be manually adjusted by temporarily disengaging spring clip 92 from the hexagonal portion 86 to permit the adjuster screw 82 to be rotated freely for axial movement into, or out of, the adjuster housing 72. The rotational force applied to the screw 82 may be made to overcome the spring force acting against hexagonal portion 86 to permit adjustment by detent action between the clip 92 and the hexagonal flats of portion 86.

Brake lever 46 is provided with a hand brake abutment surface 100 on its inboardly end portion 60. The hand brake includes a pair of slideable equalizers 102 and 102a each having a vertical abutment bar 104 on its surface 10 adjacent its outward end 107. During braking action by the hand brake, the two equalizer bars 102 and 102a move simultaneously away from each other and the abutment bars 104 engage their corresponding lever abutment surfaces 100 of the actuating levers 46 throughout the full outward travel of the equalizer bars 102 and 102a. A each of the equalizer bars 102 and 102a continues to move apart during braking action, lever 46 is pivoted to move the brake shoe 68 connected thereto into engagement with the wheel 18 in the same manner as though it were actuated by the power unit 26.

The abutment bars 104 are reinforced by lugs 108 welded to the bars and to the respective equalizers 102 and 102a. The equalizer bars 102 and 102a are slidably supported upon a pair of hanger assemblies, generally designated at 116.

The hanger assemblies 116 are suspended downwardly from the bolster 14 and are shown as comprising a generally U-shaped bracket 118 having parallel side walls 120 engaging the bolster side walls 122 and 124, and a pair of support pieces 126 each having an upwardly extending end portion 128 engaged with a bracket side wall 120 and having its opposite end 130 secured to the central portion 132 of bracket 118.

Bracket 118 and supports 126 provide guide supports which permit both equalizer bars 102 and 102a to be slideably supported adjacent the lower side of the bolster 14 for limited movement laterally, inwardly, and outwardly, as shown in FIGURE 5.

Stop pins 134 are provided on the equalizer bars 102 and 102a, adjacent the hanger assemblies 116, to limit lateral movement of the bars. Equalizer bar 102 is provided with a double jaw 110 having its first jaw portion 112 pivotally connected centrally between the ends of said bar, and a second jaw portion 114 extending outwardly therefrom.

Equalizer bar 102a is provided with a double jaw 138 having its first jaw portion 140 pivotally connected centrally between the ends of bar 102a, and a second jaw portion 142 extends outwardly therefrom. Double jaw 138 on bar 102a is oppositely disposed to double jaw 110 on bar 102.

A dead lever 144 has its lower end pivotally connected to the second jaw portion 142 and its upper end to a pair of dead lever straps 146, one disposed on each side of lever 144. The opposite ends of dead lever straps 146 are pivotally secured to opposite sides of a dead lever lug 148 fixedly secured to the bolster side wall 124.

Live brake lever 150 is pivotally connected at its lower end to the second jaw portion 114, and its upper end is pivotally connected to an operating rod 152 connected to any suitable hand brake operating device (not shown) to actuate the rod 152. It is understood that operating rod 152 could be used as a tension member, as shown, or reversed substantially 180° and be operated as a compression member.

A floating push rod 154 is disposed substantially horizontally so as to extend through aligned openings 156 and 158 through the side walls 124 and 122, respectively, of the bolster 14. One end of the push rod 154 is pivotally connected intermediate the ends of dead lever 144 and the other end is pivotally connected intermediate the ends of lever 150.

When a handbrake application is made, rod 152 causes the upper end of live brake lever 150 to pivot inwardly about the pivotal axis of lever 150 at the end of push rod 154, thereby causing the equalizer 102, pivotally connected to the lower end thereof through jaw 110, to move outwardly. However, any oppositional force to outward movement of the equalizer 102, will cause the push rod 154 to have its end pivoted to lever 150 to move inwardly due to pivoting action of lever 150 about its pivoted axis double jaw 110 at the lower end thereof. Consequently, with the opposite end of the push rod 154 being connected intermediate the ends of dead lever 144, the lower end of the dead lever 144 and the equalizer 102a will move outwardly thereby providing substantially equal operating forces with equalizer 102 to actuate the actuating lever 46 as described above.

Figure 6:
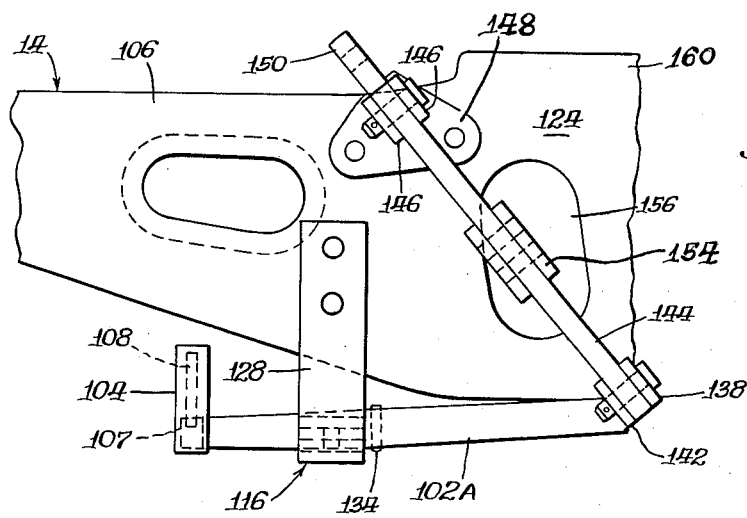
FIGURE 6 is an end view of the structure illustrated in FIGURE 4.

Dead lever 144 and live lever 150 may be disposed to have their upper ends angled outboardly, as best seen in FIGURE 6, in order to provide clearance between the operating rod 152, together with any associated hand brake operating device and the pivotal abutment structure 160 of the bolster 14 and car supported thereon. Further, the inclined position of the levers permit the use of longer lever arms thereby permitting better mechanical advantages within the confined space.

I claim:

1. In a tread brake arrangement for a railway car truck having a side frame supported on spaced wheel and axle assemblies, an actuating lever pivotally connected to the inboard side of said frame, a brake head-shoe assembly pivotally supported from said frame for engagement by said lever, means to actuate said lever to move said brake head-shoe assembly into frictional engagement with a wheel, said brake head-shoe assembly comprising a slack adjuster screw engaged by said lever, said screw being threaded into a housing mounted on said brake head-shoe assembly, and a resilient retainer clip mounted on said lever and having legs engaging flat surfaces on said screw.

2. In a railway car truck, a truss type side frame having tension and compression members interconnected by spaced columns to define a window, a hanger pivotally connected to said compression member, a brake head pivotally connected to said hanger, an actuating lever pivotally connected to said tension member to engage and move said brake head, a power device mounted on said tension member below said window to actuate said lever, said power device having a piston rod pivotally connected to said lever intermediate the ends thereof, and a slack adjusting screw mounted on said brake head for engagement by said lever, and means including a spring clip interconnecting said lever and screw.

3. In a tread brake arrangement for a railway car truck having a frame and supporting wheel and axle assemblies, a brake head-shoe assembly having a friction surface engageable with the tread of said wheel, means to pivotally suspend said brake head-shoe assembly from said frame, a power unit secured to said frame, a piston rod extending outwardly from said power unit, an actuating lever pivotally connected to said frame, said piston rod being pivotally connected to said actuating lever, an abutment surface on said actuating lever, slack adjuster means provided on said brake head-shoe assembly and having a surface thereon engageable with said abutment surface, and a spring clip detachably connecting said slack adjuster means to said actuating lever.

4. In a tread brake arrangement for a railway truck having a frame and a wheel and axle assembly, a brake head, a brake shoe secured to said brake head, hanger means to support said brake head from said frame, an actuating lever pivotally secured to said frame, a power actuating means mounted on said frame and operatively connected to said actuating lever, a slack adjuster arrangement including an internally threaded housing mounted on said brake head, an adjuster screw having a threaded end portion engaged in said housing and having a hexagonal portion extending outwardly from said housing, an abutment flange mounted on said hexagonal portion for engagement by said actuating lever, and resilient clamping means springingly engaging said actuating lever and having end portions extending over said abutment flange and springingly engaging said hexagonal portion.

5. In a tread brake arrangement for a railway truck, a break head, a brake head actuating lever, a slack adjuster housing mounted on said brake head and having a threaded opening, an adjuster screw having a portion thereof engaged in said threaded opening, a plurality of flat surfaces on said adjuster screw, a flange on said adjuster screw engaged by said lever, a resilient member mounted on said lever and having end portions extending over said flange and engaging said flat surfaces.

(References on following page)

References Cited in the file of this patent

UNITED STATES PATENTS

| | | |
|---|---|---|
| 317,571 | Poor | May 12, 1885 |
| 434,874 | Lawrence | Aug. 19, 1890 |
| 2,112,530 | Holloway | Mar. 29, 1938 |
| 2,398,285 | Browall | Apr. 9, 1946 |
| 2,883,005 | Polanin | Apr. 21, 1959 |
| 2,930,450 | Mann et al. | Mar. 29, 1960 |
| 2,940,553 | Newell et al. | June 14, 1960 |

FOREIGN PATENTS

| | | |
|---|---|---|
| 785,206 | France | May 13, 1935 |